Figure 1:
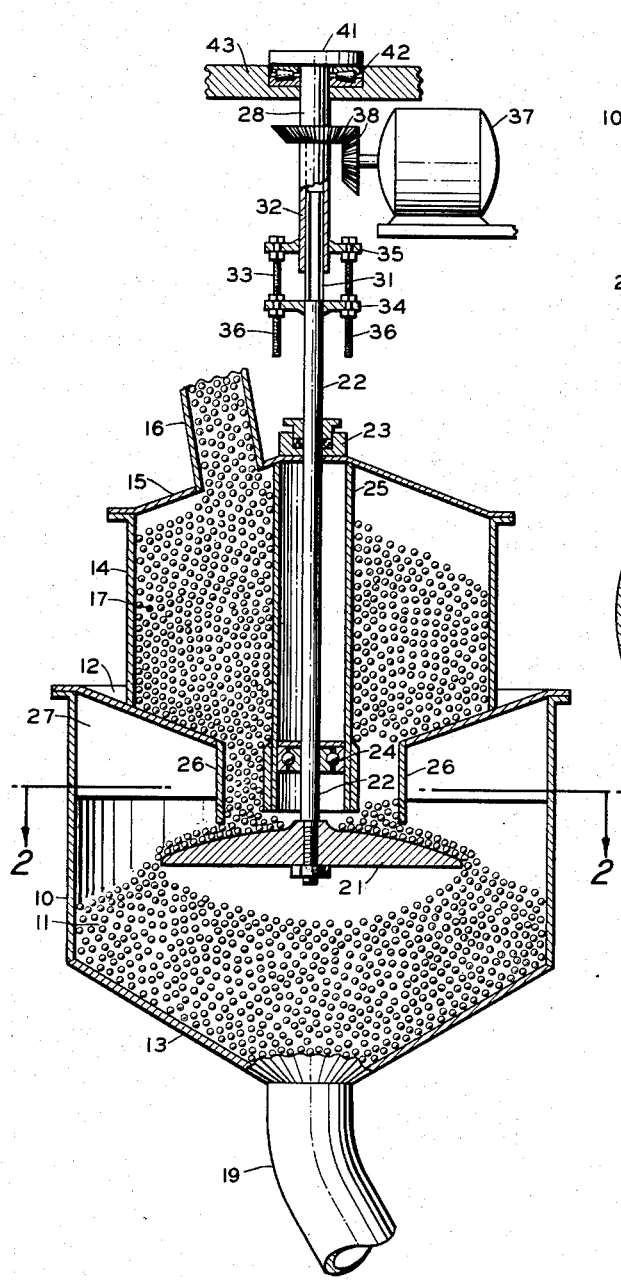

Oct. 26, 1954

J. F. CHURCH 2,692,702

PEBBLE FEEDER

Filed Dec. 9, 1949

INVENTOR.
J. F. CHURCH
BY *Hudson & Young*

ATTORNEYS

Patented Oct. 26, 1954

2,692,702

UNITED STATES PATENT OFFICE 2,692,702

PEBBLE FEEDER

J. Frank Church, Bartlesville, Okla., assignor to Phillips Petroleum Company, a corporation of Delaware Application December 9, 1949, Serial No. 132,052

15 Claims. (Cl. 222—1)

This invention relates to an improved centrifugal feeder device for regulating the flow of particulate contact and/or heat-transfer material, particularly in the form of pebbles, and to a process for regulating the flow of these types of materials. A specific aspect of the invention pertains to pebble feeders and to methods of regulating pebble flow in a gravitating stream.

Pebble heaters and similar type equipment are being widely used in gas solid contacting operations, particularly where high heating rates at elevated temperatures are required. This type of apparatus includes an upper pebble heating chamber where the pebble contact material is heated to high temperature by contact with hot combustion gas and a subjacent reaction or gas heating chamber connected by an unobstructed pebble throat. In operation the pebbles are maintained in a contiguous compact stream or column from the inlet of the upper heating chamber to a feeder or flow regulating device positioned in the conduit or pebble chute leading from the outlet at the bottom of the lower heating chamber to the bottom of a pebble elevator utilized for transferring the pebbles to the upper end of the system. By maintaining a compact contiguous column of pebbles from the inlet of the upper chamber to the feeder device maximum utilization of the capacity of the apparatus is attained and the column of pebbles in the throat between chambers and in the other transfer conduits reduces the tendency for gas to flow from both chambers through the pebble conduits.

Several types of feeder devices including star valves, vibratory feeders, and disk type feeders are in use. Conventional disk type feeders leave much to be desired in the way of efficient operation with a minimum of pebble abrasion and feeder wear. Disk type feeders heretofore known comprise a feeder housing into which is extended axially from above the housing an inlet conduit through the center of which extends a shaft or axle having a pebble feeder disk on the lower end thereof. The disk has an upwardly projecting lip around its perimeter so as to hold one or more layers of pebbles on the disk at all times. The inlet conduit is made vertically adjustable so as to vary the clearance between the feeder table and the end of the conduit. The rate of pebble flow is regulated by varying this clearance and by varying the rate of rotation of the table. With this type of construction there results an undue amount of pebble breakage and pebble abrasion with consequent replacement requirement and there is also an undue amount of abrasion on the feeder shaft around which the descending column of passes. In this feeder construction described, the gravitating column of pebbles bears down on the table and pushes against the shaft or shaft sleeve and the table has the effect of twisting this compact column of pebbles by applying torque to the lower end thereof without any opportunity for the pebbles to move in any direction except outwardly to relieve the various directional forces acting in the lower end of the pebble column so as to thereby reduce pebble abrasion and equipment abrasion in this area. A concomitant disadvantage is found in the requirement for additional power to operate this type of feeder as compared with a feeder which reduces abrasive and grinding forces in this area to a minimum.

Another drawback to the type of feeder construction described is that no provision is made for a sshaft bearing near the lower end of the shaft. This lack of stability of the shaft permits whipping and vibration of its lower end which not only increases the grinding and abrasion of the pebbles and equipment but also appreciably decreases the life of the upper shaft bearing and the shaft itself as well as the driving mechanism.

It is with the improvement of the conventional disk type pebble feeder that this invention is concerned. One of the objects of the invention is to provide a more efficient disk type feeder for gravitating small solid contact material. Another object is to reduce shaft and disk abrasion in such feeders. A further object is to provide a feeder process and apparatus which reduces pebble breakage and attrition. It is also an object of the invention to increase shaft stability and life as well as bearing life in a disk type feeder. Other objects of the invention will become apparent from a consideration of the accompanying disclosure.

Figure 2:
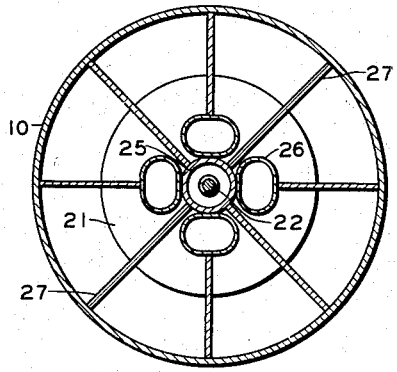
Figure 3:
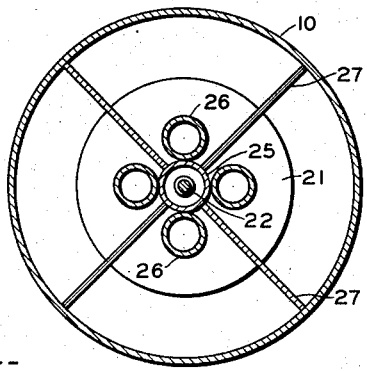
Figure 4:
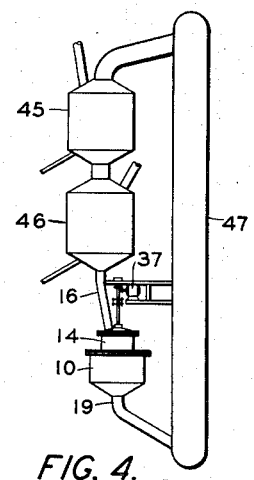

A more complete understanding of the invention may be had by reference to the drawing of which Figure 1 is an elevation, partly in section, of a preferred modification of the invention. Figure 2 is a cross-section of the apparatus of Figure 1 taken on the line 2—2. Figure 3 is a similar cross-section of another modification of the apparatus showing cylindrical feeder conduits. Figure 4 is a plan view showing the arrangement of conventional pebble heater apparatus in combination with the feeder of the invention. All of these figures are diagrammatic and do not attempt to show all of the details of construction which are used in the construction of the apparatus.

Referring now to Figure 1, the apparatus comprises a main pebble feeder housing 10 enclosing feeder chamber 11 which has a concave top closure member 12 and a bottom member 13 in the shape of a hopper for more efficient flow of the pebbles out of the feeder. A pebble collection chamber housing 14 is disposed coaxially with the main feeder housing and superposed thereon. Pebble collection chamber 14 is closed on top by cover 15 through which pebble inlet chute 16 admits pebbles to collection chamber 17. A pebble conduit 19 transfers pebbles from the feeder to the lower end of the elevator 47 (shown in Figure 4).

A rotating disk 21 is suspended axially in chamber 11 by shaft 22 which is positioned in bearings 23 and 24. These bearings may be of any type suitable for the particular conditions under which the feeder is used. Bearing 23 is desirably a combination bearing and packing gland which prevents egress of gases around the feeder shaft. Both bearings 23 and 24 may be of the bushing or sleeve type or they may be ball bearings or roller bearings according to the operating conditions. An important feature of the invention is the shaft housing 25 disposed coaxially around shaft 22 in spaced-apart relation thereto and extending from cover plate 15 just under bearing 23 to housing cover 12 adjacent bearing 24. Various types of construction at the lower end of this housing are within the scope of the invention. As shown in Figure 1 the housing extends beyond cover plate 12 but it is feasible to utilize the center section of cover plate 12 as the end closure member of housing 25.

Passageways from pebble collection chamber 17 to pebble feeder chamber 11 are provided by a plurality of conduits 26 directed downwardly toward disk 21 and being coextensive laterally with a limited portion of the area of the disk intermediate its center and perimeter. This arrangement delivers pebbles onto disk 21 in an annular path so as to provide a pebble-free space surrounding the base of the shaft and thereby eliminate shaft abrasion from the pebbles. This also permits the pebbles to move in any direction, including inwardly and outwardly, without obstruction when torque is applied to the lower ends of the individual pebble columns and thereby reduces resistance to flow with concomitant reduction in abrasion. The feeder conduits 26 must be at least four pebble diameters across when circular in cross-section so as to avoid bridging and stoppage of pebble flow. With a cross-section such as shown in Figure 2 the width must be greater than twice the pebble diameter and the larger dimension must be more than four pebble diameters. These conduits are spaced inwardly from the perimeter of the disk so as to prevent continuous flow of pebbles through the passageway and over the disk when the disk is brought to rest.

A series of supports or braces 27 positioned under cover member 12 and extending from housing 10 inwardly to the pebble conduit 26 or to the proximity of the shaft bearing 24 impart rigidity to the housing cover and support for the pebble load thereon. These supports may be suitably welded to the shell and to the feeder conduits.

Shaft 22 is aligned with a motivating shaft 28 which it cooperatively engages through hexagonal sections 31 and 32 of shafts 22 and 28, respectively, and through adjustable coupling member 33. This coupling member comprises a pair of spaced-apart flanges or plates 34 and 35 which are integral with shafts 22 and 28, respectively. Bolts 36 serve to raise and lower shaft 22 so as to adjust the elevation of disk 21 with respect to the level of the delivery end of pebble feeder conduits 26 in accord with the flow characteristics of the pebble material being fed through the apparatus. Motivating shaft 28 is in turn motivated by an electric motor 37 or other suitable power device through a set of gears 38. The shaft assembly is supported by heavy bearing plate 41 on the upper end of shaft 28. This bearing plate cooperates with bearing 42 supported in a suitable frame 43, a part only of which is shown. In this manner bearing 42, which is preferably a roller bearing, and plate 41 support the weight of the shaft assembly and the pebble load on the disk 21 while bearings 23 and 24 merely keep shaft 22 in alignment so as to prevent vibration and whipping of the shaft during operation.

Coupling device 33 is only one of many arrangements which may be utilized to regulate the elevation of disk 21. It is also within the scope of the invention to use a solid single shaft attached to plate 41 and raise and lower the shaft and disk by raising and lowering frame 43.

Figures 2 and 3 show more clearly the arrangement of supports 27, feeder conduits 26, and shaft housing 25 in relation to shaft 22. The conduits 26 shown in Figure 2 are preferable to the cylindrical conduits shown in Figure 3 because they provide better flow characteristics for a given area of cross-section than the cylindrical type. While a series of four symmetrically spaced conduits is shown, any number from two to eight may be utilized. Another modification of the pebble conduit means, not shown, comprises a completely annular conduit or passageway surrounding shaft 22 and housing 25. In this type of construction the outer wall of the conduit may consist of a ring of the proper height and diameter and the inner wall may be formed by the extension of housing 25 or by a separate similar ring of smaller diameter than the ring forming the outer wall. In such an arrangement several rods or vertical plates in a spider arrangement may be positioned across the pebble passageway so as to fix the position of the inner ring or the lower end of housing 25, as the case may be.

Figure 4 shows a pebble heater arrangement including a pebble heating chamber 45, a reactor or gas heating chamber 46 connected with chamber 45 by a pebble throat or conduit, and pebble feeder 10 connected by pebble chutes or conduits 16 and 19 with the lower end of chamber 46 and elevator 47, respectively.

In the conventional pebble feeder of the disk type the disk is flat with an upwardly projecting lip around its perimeter and the elevation of the disk may be regulated within a wide range just so the angle between a line drawn from the upper edge of the lip to the lower end of the pebble delivery conduit and the horizontal is not greater than the angle of repose of the pebble material or about 30°. In this manner pebble flow is prevented when the disk is stationary but is usually sizeable when the disk is rotated. It has been found that a disk lip which maintains a stationary layer of pebbles on the disk in order to regulate the flow of pebbles is not only unnecessary but is undesirable from the standpoint of pebble and equipment abrasion and economy of power required in operating the feeder. It has been discovered that by regulating the space between the lower end of the pebble feeder conduits 26 and the top surface of disk 21 in the range of 1.1 to 2.7 pebble diameters (when operating with substantially uniform spherical pebbles) pebble stoppage can be attained by stopping the disk and the flow continued or effected by rotation of the disk at extremely low speeds. This is explained by the fact that when the disk is stationary the pebbles in the column just below the pebble conduit and in contact with the disk are locked in place by a phenomenon known as bridging. It is found that when the space between the lower end of the pebble conduits and the disk surface is maintained in the range of 1.1 to 2.7 pebble diameters, even though the pebbles outside of the column roll off the disk, the stream of pebbles flowing through the conduits is stopped when the disk is stopped. The utilization of a disk having an upwardly convex surface or even of a disk having a plane surface without an upwardly projecting lip eliminates the rolling of the outwardly flowing pebbles over a stationary layer of pebbles on the disk. Elimination of this feature alone greatly reduces pebble and lip abrasion as well as pebble breakage. This reduction taken with the elimination of wear and abrasion of the pebbles around the base of the shaft cuts the loss of pebbles in the feeder approximately one-half and thereby greatly enhances the utility of a disk type feeder of this construction.

The shape of the top surface of the disk may range from a plane or slightly concave surface to an upwardly convex surface. The term convex includes arcuate or pyramidal surfaces. As a further example of a convex surface, a conical disk may be utilized with the disk shaft running through the axis of the cone. In any case it is essential that the perimeter of the disk is outside of the outermost edge of the pebble delivery conduits so as to facilitate the control of pebble flow. In cases where a convex disk surface is utilized, the angle between the disk surface at a point just below the outermost edge of the pebble delivery conduit and the horizontal should preferably not exceed approximately 18°. However, this angle may be even greater than 18° if the maximum space between the disk and the pebble delivery conduit is gradually reduced from 2.7 down to 2.2 pebble diameters as the angle is increased upwardly from 18°. When utilizing a feeder disk having a convex upper surface, the disk may be desirably hollow in order to decrease the weight of the disk. In some modifications of the disk it may be desirable to cut or form the disk with spiral or annular flutes or grooves therein. In cases where the top surface of the disk is markedly convex it is advantageous to shape the bottom end of the pebble delivery conduits to conform to the disk contour directly below.

When utilizing the invention, the flow rate of the material being fed through the feeder may be varied both by regulating the spacing between the pebble delivery conduits and the disk, and by varying the speed of rotation of the disk. Increasing the spacing and/or the rate of rotation increases the flow of pebbles and the regulation of these two variables affords a wide range of pebble flow to accommodate the heat requirements in any pebble heater process.

Another method of supporting the feeder disk is by a vertically adjustable shaft extending into the feeder chamber from below. In this type of construction a shaft bearing just below the disk may be supported by a spider arrangement of channel metal or other supporting structure of similar nature. In this modification of the shaft and disk, pebbles may be delivered to the disk by a coaxial pebble delivery conduit with less disadvantage than this type of delivery entails when using a disk suspended by a shaft extending into the chamber from above.

The ease of operation and the flow capacity of the disk feeder of the invention, especially when utilizing a convex disk, is greatly enhanced due largely to the ease with which pebbles flow over the disk. When utilizing a feeder, such as that shown in Figure 1, having a 20 inch disk and four feeder conduits having a 5″ x 7″ cross-section similar to that shown in Figure 2 spaced 1½″ above the disk, a flow of 3/16″ smooth alumina pebbles of 40,000 pounds per hour is effected with a disk rotation of between 6 and 8 revolutions per minute. With increased disk speed higher flow rates are effected and vice versa. Disk speeds of one or two R. P. M. up to about 30 R. P. M. are sufficient to handle the pebble flow requirements of conventional pebble heater processes.

For a pebble heater reactor having a 4'–6" I. D. when cracking a hydrocarbon stream consisting of 80% ethane, 20% propane, and 20% methane (weight percent) at the rate of 71,000 cubic feet per hour to produce approximately 45,000 pounds of ethylene and 6,000 pounds of propylene per 24 hour day an average pebble circulation of 40,500 pounds per hour is required under optimum operating conditions.

The feature of the invention whereby the pebbles are fed from the collection chamber 17 onto disk 21 in an annular path spaced considerably apart from the base of shaft 22 has independent utility from the shape of the disk itself since it eliminates abrasion of the base of the shaft irrespective of the shape of the disk and, taken in combination with the stationary housing 25, offers a substantial improvement over the conventional type of disk feeder. It is also obvious that the improvement afforded by the plane or convex type disk without the upwardly protruding lip is independent of the manner in which the pebbles are delivered to the disk, but these features taken in combination appreciably aid and assist each other in contributing to the reduction in wear, abrasion, and instability of the disk type feeder. This combination of features also cooperates to reduce by approximately one-half the power required to operate the feeder by reducing disk torque and disk speed necessary to effect required pebble flow.

Certain modifications of the invention will become apparent to those skilled in the art and the illustrative details disclosed are not to be construed as imposing unnecessary limitations on the invention.

I claim:

1. A centrifugal feeder for pebbles of substantially uniform spherical shape and size comprising a fixed upper closed pebble collection chamber surrounding the hereinafter named housing and having a pebble inlet in its upper portion; a subjacent closed pebble feeder chamber having a pebble outlet in its lower portion; a vertically adjustable centrally disposed rotatable shaft extending downwardly thru said collection chamber into said feeder chamber from a point above the former; a fixed housing surrounding said shaft in spaced apart relation thereto, being coextensive vertically with said collection chamber; bearings adjacent the ends of said housing for keeping said shaft in alignment; a plurality of unobstructed pebble conduits extending downwardly from the bottom of said collection chamber into said feeder chamber disposed symmetrically around said shaft and spaced apart therefrom so as to lie laterally outside of said housing; and a rotatable horizontal disk fixed on the lower end of said shaft extending laterally beyond said conduits and spaced from the lower ends thereof a distance within the range of 1.1 to 2.7 pebble diameters to facilitate the flow of pebbles outwardly between the lower ends of said pebble conduits and said disk upon rotation of the disk.

2. The apparatus of claim 1 in which the top surface of said disk is convex so as to facilitate pebble flow at slow disk speeds.

3. A centrifugal feeder comprising a fixed enclosed collection chamber surrounding the hereinafter named housing and having an inlet in its upper portion for gravitating particulate material thereto; a subjacent enclosed feeder chamber having an outlet in its bottom for discharging particulate material; a vertically adjustable axially disposed rotatable shaft extending upwardly from within said feeder chamber thru said collection chamber to a point above the latter chamber; means for raising and lowering said shaft; a housing fixed to said collection chamber and surrounding said shaft, spaced therefrom and extending the height of said collection chamber so as to protect said shaft from abrasion; shaft bearings adjacent the ends of said housing; a plurality of unobstructed feeder conduits extending downwardly from the bottom of said collection chamber into the upper end of said feeder chamber a uniform distance, said conduits being disposed symmetrically around and laterally outside of said housing; and a horizontal disk fixed on the lower end of said shaft extending laterally beyond said conduits and spaced apart from the lower ends thereof a distance within the range of 1.1 to 2.7 average particle diameters to facilitate the flow of said material outwardly between the lower ends of said conduits and said disk upon rotation of the disk.

4. The apparatus of claim 3 in which the top surface of said disk is convex so as to facilitate material flow at slow disk speeds.

5. A centrifugal feeder for regulating the flow of a gravitating stream of $\frac{3}{16}''$ to $1''$ generally spherical pebbles of substantally uniform size which comprises an enclosed, fixed, non-rotatable pebble collection chamber of circular horizontal cross-section having a pebble inlet in its upper portion; a coaxial subjacent enclosed pebble feeder chamber of circular horizontal cross-section having a pebble outlet in its lower portion; a hopper-shaped bottom in said collection chamber; a shaft extending downwardly from a point above said collection chamber axially of the chambers into the upper portion of said feeder chamber; a housing fixed to said collection chamber and surrounding in spaced-apart relation that portion of said shaft passing thru said collection chamber so as to form an annular pebble space with the walls of said collection chamber; shaft bearings adjacent the ends of said housing; a plurality of unobstructed pebble conduits symmetrically spaced around said shaft in the bottom of said collection chamber laterally positioned just outside of said housing extending downwardly into said feeder chamber a uniform distance; a horizontal disk fixed on the lower end of said shaft and rotatable therewith, said disk extending laterally beyond said conduits in spaced-apart relation thereto within the limits of 1.1 to 2.7 pebble diameters; and means for vertically adjusting the position of said disk.

6. The apparatus of claim 5 in which the top surface of said disk is convex so as to facilitate pebble flow at slow disk speeds.

7. A centrifugal feeder comprising an enclosed non-rotatable collection chamber having an inlet in its upper portion for gravitating particulate material thereto; a subjacent enclosed non-rotatable feeder chamber having an outlet in its bottom for discharging particulate material; a vertically adjustable rotatable shaft extending upwardly from within said feeder chamber thru said collection chamber to a point above the latter chamber, said shaft being axial with respect to the chambers; a fixed housing surrounding said shaft, spaced therefrom and extending the height of said collection chamber so as to protect said shaft from abrasion and form an annular pebble space with the walls of said collection chamber; shaft bearings adjacent the ends of said housing; an unobstructed horizontal disk fixed on the lower end of said shaft and rotatable therewith; means for raising and lowering said disk and a plurality of conduit means extending downwardly from the bottom of said collection chamber to such a level above said disk that particulate material rolls outwardly over said disk when the disk is rotated and ceases to flow when the disk is stationary, said conduit means being disposed around said shaft so as to deliver particulate material to an annular section of said disk spaced-apart from said shaft and from the circumference of said disk.

8. A process for regulating the flow of a gravitating contiguous stream of pebbles of substantially uniform spherical shape and size which comprises discharging the pebbles in a feeder zone thru unobstructed conduit means disposed symmetrically around a central shaft in spaced-apart relation thereto onto a horizontal disk rotating on said shaft so as to maintain a pebble-free space at the juncture of said shaft and disk thereby avoiding contact between and reducing abrasion of the shaft and pebbles; maintaining the elevation of said disk in the range of 1.1 to 2.7 pebble diameters so that pebbles flow outwardly directly on the surface thereof at disk speeds as low as the range of 1 to 2 R. P. M. and cease to flow when the disk is at rest; and gravitating pebbles from the lower part of said feeder zone.

9. The method of operating the apparatus of claim 1 which comprises maintaining a contiguous mass of pebbles in said collection chamber and pebble conduits so as to continuously deliver pebbles to said disk when same is rotating, maintaining a space between the top surface of said disk and said pebble conduits within the range of 1.1 to 2.7 pebble diameters, rotating said disk at a speed in the range of 1 to 30 R. P. M. to regulate the flow of pebbles, and stopping said disk to stop pebble flow.

10. A centrifugal feeder comprising an enclosed non-rotatable collection chamber surrounding the hereinafter named housing and having an inlet in its upper portion for gravitating particulate material thereto; a subjacent enclosed feeder chamber having an outlet in its bottom for discharging particulate material; a vertical axially disposed rotatable shaft extending upwardly from within said feeder chamber thru said collection chamber to a point above the latter chamber; a fixed housing surrounding said shaft, spaced therefrom and extending the height of said collection chamber so as to protect said shaft from abrasion; shaft bearings adjacent the ends of said housing; a plurality of feeder conduits extending downwardly from the bottom of said collection chamber into the upper end of said feeder chamber a uniform distance, said conduits being disposed symmetrically around and laterally outside of said housing; and a horizontal disk fixed on said shaft in the upper part of said feeder chamber extending laterally beyond said conduits and spaced apart from the lower ends thereof a distance within the range of 1.1 to 2.7 average particle diameters to facilitate the flow of said material outwardly between the lower ends of said conduits and said disk upon rotation of the disk.

11. A centrifugal pebble feeder comprising an enclosed fixed feeder chamber having pebble outlet means in the lower portion thereof; a vertical axially disposed rotatable shaft extending into said chamber; a horizontal disk fixed on said shaft in spaced-apart relation to the top and bottom of said chamber, said disk having a convex top surface and extending outwardly beyond the pebble inlet conduit means described hereinafter; upright unobstructed pebble inlet conduit means leading into said chamber directly above said disk spaced-apart from said shaft so that pebbles being fed onto said disk avoid contact with said shaft at the juncture of said shaft and said disk and spaced apart from said disk a distace within the range of 1.1 to 2.7 pebble diameters; and means for adjusting the vertical space between said disk and said inlet conduit means within said range.

12. A centrifugal pebble feeder comprising an enclosed feeder chamber having pebble outlet means in the lower portion thereof, a vertical axially disposed rotatable shaft extending into said said chamber; a lipless horizontal disk fixed on said shaft in spaced-apart relation to the top and bottom of said chamber, said disk allowing pebbles to roll outwardly from said shaft directly on the top surface of said disk and extending outwardly beyond the pebble inlet conduit means described hereinafter; and upright unobstructed pebble inlet conduit means leading into said chamber directly above said disk spaced apart from said shaft so that pebbles being fed onto said disk avoid contact with said shaft at the juncture of said shaft and said disk and spaced apart from said disk a distance within the range of 1.1 to 2.7 pebble diameters.

13. A centrifugal feeder for feeding substantially uniform and spherical particles, comprising a fixed feeder chamber having a particle feeder conduit depending therefrom; a rotatable generally horizontal disk of greater diameter than said feeder conduit disposed directly below and spaced apart therefrom a distance within the range of 1.1 to 2.7 particle diameters, said disk having an unobstructed top surface; a shaft supporting said disk in said position; and a collection chamber below said disk for receiving said particles.

14. The method of operating the apparatus of claim 13 which comprises maintaining a contiguous mass of pebbles in said pebble conduit means so as to continuously deliver pebbles to said disk when same is rotating, maintaining a space between the top surface of said disk and said conduit means within the range of 1.1 to 2.7 pebble diameters, rotating said disk at a speed in the range of 1 to 30 R. P. M. to regulate the flow of pebbles, and stopping said disk to stop pebble flow.

15. The apparatus of claim 13 in which said disk has a convex upper surface.

References Cited in the file of this patent

UNITED STATES PATENTS

| Number | Name | Date |
|---|---|---|
| 74,125 | Pickens | Feb. 4, 1868 |
| 279,842 | Taggart | June 19, 1885 |
| 830,542 | Trump | Sept. 11, 1906 |
| 1,272,726 | Thompson | July 16, 1918 |
| 1,801,980 | Robinson et al. | Apr. 21, 1931 |
| 2,468,712 | Kohler | Apr. 26, 1949 |